United States Patent [19]

Cartigny

[11] Patent Number: 5,370,259
[45] Date of Patent: Dec. 6, 1994

[54] CLAMPING LOCKING-UNLOCKING DEVICE FOR A VESSEL COVER

[75] Inventor: Michel Cartigny, Mirebeau, France

[73] Assignee: Seb S.A., Selongey Cedex, France

[21] Appl. No.: 196,833

[22] Filed: Feb. 15, 1994

[30] Foreign Application Priority Data

Feb. 15, 1993 [FR] France .................. 93 01961

[51] Int. Cl.$^5$ .................. A47J 27/08; A47J 27/09; B65D 45/00; B65D 45/34
[52] U.S. Cl. .................. 220/316; 99/337; 99/403; 220/203; 220/293
[58] Field of Search .............. 99/330, 337, 338, 342, 99/340, 403; 220/203, 209, 293, 316, 319, 325, 912; 126/369, 377, 378, 373, 374, 388, 389

[56] References Cited

U.S. PATENT DOCUMENTS

| 2,549,387 | 4/1951 | Richeson | 220/316 |
|---|---|---|---|
| 4,024,982 | 5/1977 | Schultz | 220/293 |
| 4,135,640 | 1/1979 | MacQuilkin et al. | 220/316 |
| 4,161,260 | 7/1979 | Lagostina | 220/319 |
| 4,162,741 | 7/1979 | Walker et al. | 220/203 |
| 4,574,988 | 3/1986 | Karliner | 220/316 |
| 4,711,366 | 12/1987 | Chen | 99/337 |
| 4,733,795 | 3/1988 | Boehm | 220/316 |
| 4,796,776 | 1/1989 | Dalquist et al. | 220/203 |
| 4,932,550 | 6/1990 | Moucha | 99/403 |
| 5,048,400 | 9/1991 | Ueda et al. | 99/403 |

FOREIGN PATENT DOCUMENTS

| 785438 | 5/1935 | France . |
| 1006133 | 4/1957 | Germany . |
| 8905111 | 8/1989 | Germany . |
| 613802 | 12/1948 | United Kingdom . |
| WO9203080 | 3/1992 | WIPO . |

Primary Examiner—Timothy F. Simone
Attorney, Agent, or Firm—Spensley Horn Jubas & Lubitz

[57] ABSTRACT

A locking-unlocking device for a cooking vessel having a vertical center axis and composed of a container and a cover, for securing the cover to the container, the container having a side wall with an upper peripheral edge defining an open top, the device including a plurality of locking jaw assemblies mounted on the vessel at locations spaced apart about the center axis of the vessel, each locking jaw assembly including locking jaws which are movable into a locking position for securing the cover to the container; and an unlocking element linked to the locking jaws for moving the locking jaws to an unlocking position in which the cover is separable from the container. Each locking jaw assembly further includes a biasing member operatively associated with the locking jaws for elastically urging the locking jaws in radial directions relative to the vessel center axis in a direction from the unlocking position to the locking position; a blocking member movable between an extended position for maintaining the locking jaws in the unlocking position and a retracted position for allowing the locking jaws to be positioned in response to the member; and a release member coupled to the blocking member and operative for causing the blocking member to move to the retracted position.

20 Claims, 5 Drawing Sheets

CLAMPING LOCKING-UNLOCKING DEVICE FOR A VESSEL COVER

BACKGROUND OF THE INVENTION

The present invention relates to the general technical field of devices for closing a cover on a container in order to form a vessel for cooking, preferably under pressure.

The present invention relates more specifically to a locking-unlocking device for locking a cover on a container in order to form such cooking vessel, the locking-unlocking device being composed of locking jaws movably mounted on, and spaced apart around the circumference of, the container, the jaws being capable of being subjected to the action of an unlocking means in order to move them away from their position for locking the cover on the container.

Locking-unlocking devices for vessels for cooking under pressure are already known in the art. For example, German Patent Application DE-A-4026166 discloses a device having jaws mounted in a cover to be radially movable. The jaws, of which there are two, are disposed diametrically opposite one another in the body of the cover and are intended to grip the peripheral edge of the container in their closing position. Displacement of the jaws is controlled by a control device actuated by a button, the control device being mounted at the center of the cover to be movable along the vertical axis of symmetry of the vessel. The control device is provided with specially formed engagement surfaces which act, upon displacement of the control button, on inclined surfaces which are fixed to the jaws in order to displace them radially. Such a control system thus transforms an axial movement into a radial displacement movement of the jaws between opening and closing position.

Such a system eliminates the necessity for establishing a relatively precise position between the cover and the container at the start of closing. On the other hand, such a system requires the operation of a series of parts which are movable relative to one another in order to assure control and displacement of the jaws. Considering the overall arrangement, the operating cost and the relative operating reliability of the prior art arrangement, it does not represent an optimal arrangement.

In addition, it must also be noted that the centered position of the control button can be considered as a factor which has a negative influence on the overall safety of appliances constructed according to the above-described prior art principle, to the extent that the user can be tempted to utilize the button as a means for gripping, and possibly even carrying, the vessel. In such a case, the user risks inadvertently activating the device for opening the jaws.

Finally, it is in order to note that the above-described control mechanism implies that the user must exert a substantially bidirectional control force.

SUMMARY OF THE INVENTION

An object of the present invention is to overcome, or at least ameliorate, the above-noted drawbacks and disadvantages, and to provide a novel locking-unlocking device provided with jaws, having a particularly simple structure, not requiring a precise initial positioning of the cover relative to the container, and requiring, on the part of the user, only simple, effortless control movements, while at the same time achieving maximum safety.

A further object of the invention is to provide a locking-unlocking device capable of offering the user significant safety by preventing any unintended opening.

A further object of the invention is to provide a locking-unlocking device which is dimensioned in a manner to distribute in a homogeneous manner the totality of the mechanical forces resulting from the interior steam pressure necessary for cooking.

An additional object of the invention is to provide a locking-unlocking device which requires on the part of the user only a single type of control movement which can be easily learned.

Another object of the invention is to provide a novel container cover, more particularly but not exclusively intended to be used with the above-described locking-unlocking device, the cover being particularly constructed to resist any significant deformations, while having a simplified structure.

The above and other objects are achieved, according to the invention, by a locking-unlocking device for a cooking vessel having a vertical center axis and composed of a container and a cover, for securing the cover to the container, the container having a side wall with an upper peripheral edge defining an open top, the device including: a plurality of locking jaw assemblies mounted on the vessel at locations spaced apart about the center axis of the vessel, each locking jaw assembly including locking jaws which are movable into a locking position for securing the cover to the container; and unlocking means linked to the locking jaws for moving the locking jaws to an unlocking position in which the cover is separable from the container, wherein each locking jaw assembly further comprises: biasing means operatively associated with the locking jaws for elastically urging the locking jaws in radial directions relative to the vessel center axis in a direction from the unlocking position to the locking position; blocking means movable between an extended position for maintaining the locking jaws in position and a retracted position for allowing the locking jaws to be positioned in response to the biasing means; and release means coupled to the blocking means and operative for causing the blocking means to move to the retracted position.

Other features and advantages of the invention will become more readily apparent from the description to be presented below with reference to the drawings, of non-limiting exemplary embodiments of the invention.

DESCRIPTION OF THE PREFERRED EMBODIMENTS

Figure 1:
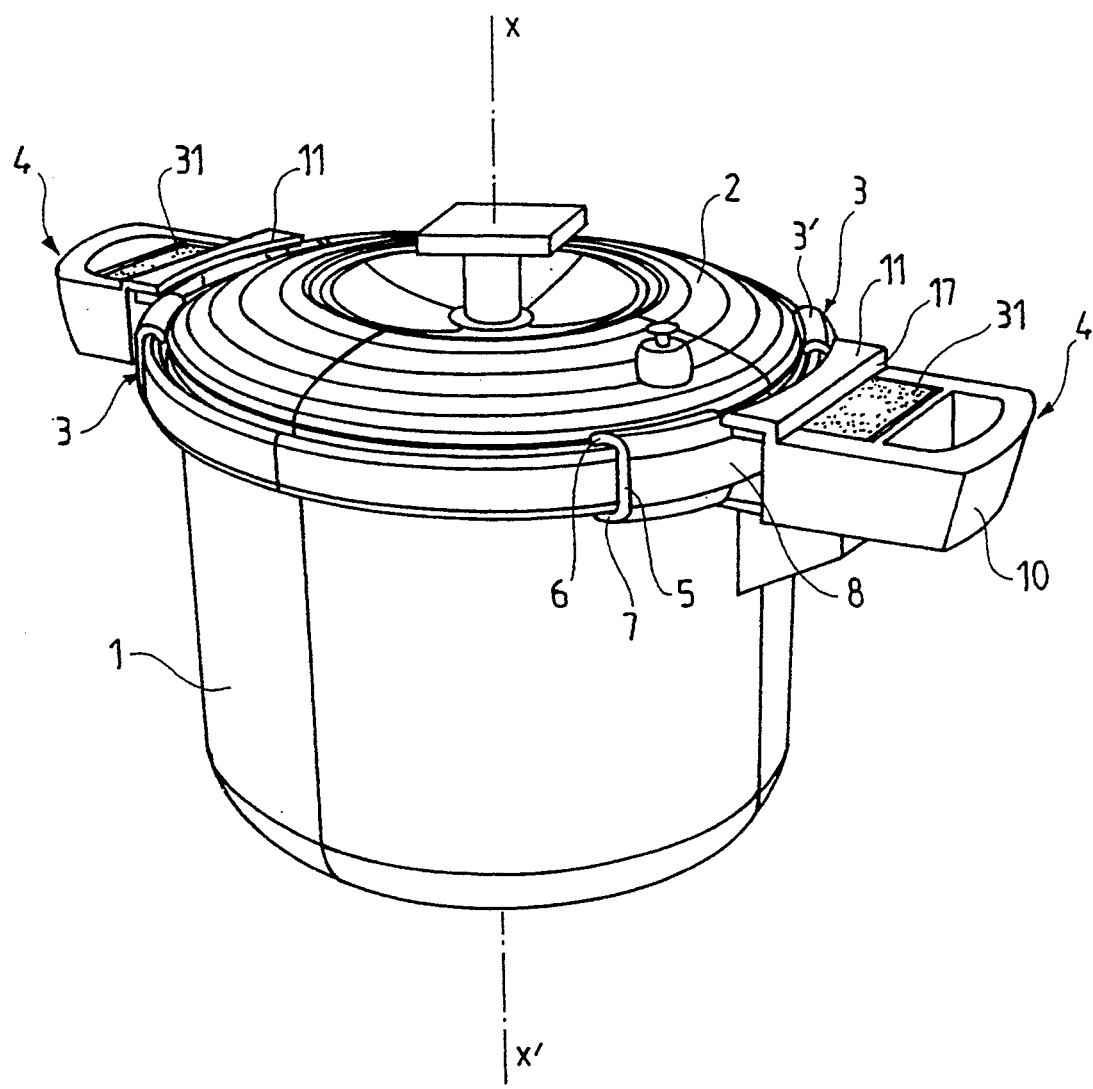
FIG. 1 is a perspective view of a pressure cooker equipped with an embodiment of a locking-unlocking device according to the invention.

The locking-unlocking device according to the invention is preferably intended to be integrated into a pressure cooking vessel which may, for example, have the form of the pressure cooker shown in FIG. 1.

Figure 2:
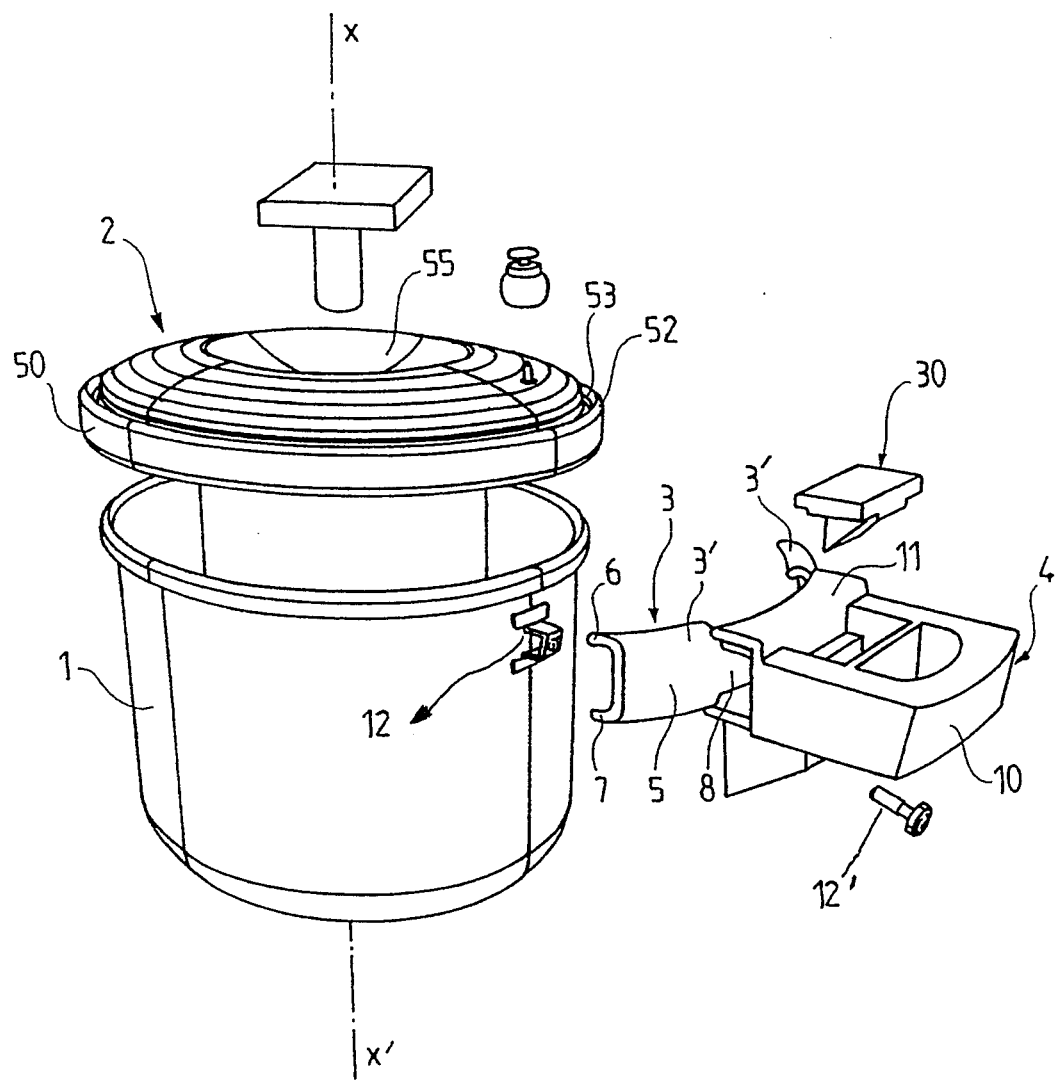
FIG. 2 is an exploded perspective view of the structure shown in FIG. 1, showing the principal elements of the locking-unlocking device of FIG. 1.

The pressure vessel shown in FIGS. 1 and 2, of the pressure cooker type, includes, as is conventional, a pot, or container, 1, which typically has a cylindrical form and upon which a cover 2 is intended to be secured in a sealed manner, for example through the intermediary of a hermetic sealing member.

In the preferred embodiments shown in FIGS. 1 and 2, the pressure vessel is provided with two locking jaw assemblies each fixed to container 1 via a respective one of two handles 4. The following description will refer to one of these assemblies. The locking jaw assemblies may preferably be integrated into handle 4. Each assembly is composed of locking jaws 3 which are preferably mounted to be diametrically opposed from one another around the periphery of the vessel, i.e. around the vertical axis of symmetry x-x' of the vessel. Locking jaws 3 are intended to occupy a locking position shown in FIG. 1 in which they assure a locking of cover 2 to container 1. Locking jaws 3 present, consequently, a form corresponding generally to a circular arc extending along a portion of the periphery, or circumference, of the vessel, comparable in the present case to a sector of determined length. Each of locking jaws 3 has, at least along one length segment 3', and preferably along two length segments 3', a face 5 which is substantially parallel to the vessel wall, face 5 terminating, advantageously, at its upper part by a first folded back edge 6 directed toward the center of the vessel and intended to bear against cover 2 in order to assure locking. According to the preferred embodiment of the invention, such as shown in FIG. 2, locking jaws 3 include a second folded back edge 7 also directed toward the center of the vessel, in a manner such that each length segment 3' has a transverse cross section substantially in the form of a U. Advantageously, length segments 3' are disposed at two extremities of jaws 3 and are connected together by a connecting bar 8 having a transverse cross section in the form, for example, of a rectangle (FIGS. 3 and 4) and constituting an extension of faces 5.

Each handle 4 includes a hand grip 10 which is fixed to a mounting body 11 and is intended to be secured, in the illustrated preferred embodiment of the invention, on the wall of container 1 by any appropriate means known in the art, and for example, through the intermediary of a fixing stirrup 12 which is permanently fastened to container 1 and a screw 12' which passes through an opening in body 11 and threadedly engages in a threaded opening in stirrup 12. Body 11 defines a housing having a transverse cross section substantially in the form of a U at the interior of which locking jaws 3 are mounted to be elastically movable in a radial direction relative to axis x-x', by the intermediary of an elastic biasing means 15 (FIGS. 5 and 6) between a fixed unlocking position which is opposed by the force produced by biasing means 15 and a biased position corresponding to the locking position of locking jaws 3. In the embodiment illustrated in FIG. 5, biasing means 15 is constituted by at least one, and preferably two, compression springs 16 interposed between a central wall 17 of body 11 and face 5 or bar 8 of locking jaws 3. The compression springs 16 thus continuously exert on jaws 3 a biasing force F directed radially toward the center of the vessel and tending to move jaws 3 in this same radially inward direction toward their locking positions. Of course, any equivalent elastic biasing means can be utilized, such as leaf springs, for example.

Figure 8A:
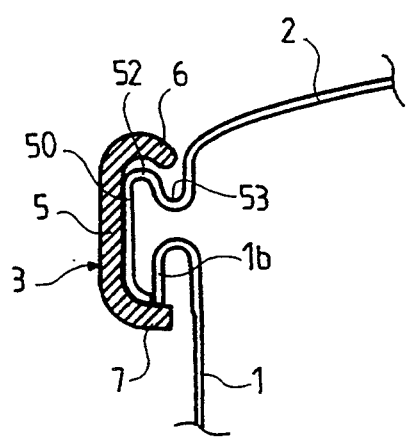
FIGS. 8a and 8b are elevational cross-sectional detail views of handles, showing the locking position of a device according to the invention just after closing and when the vessel is under pressure during cooking, respectively.
Figure 8B:
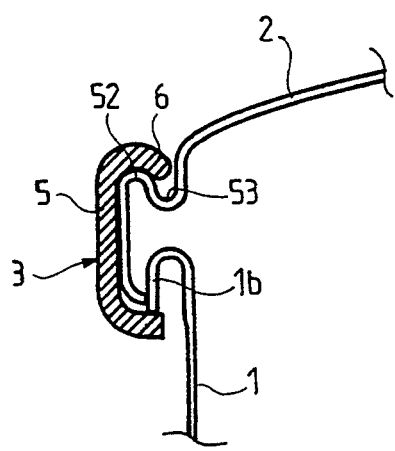

In their locking positions such as shown in FIGS. 8a and 8b, length segments 3' come to bear via their face 5 against the peripheral edge of cover 2 and come to grip, by means of edges 6 and 7, cover 2 and container 1, respectively.

Figure 3:
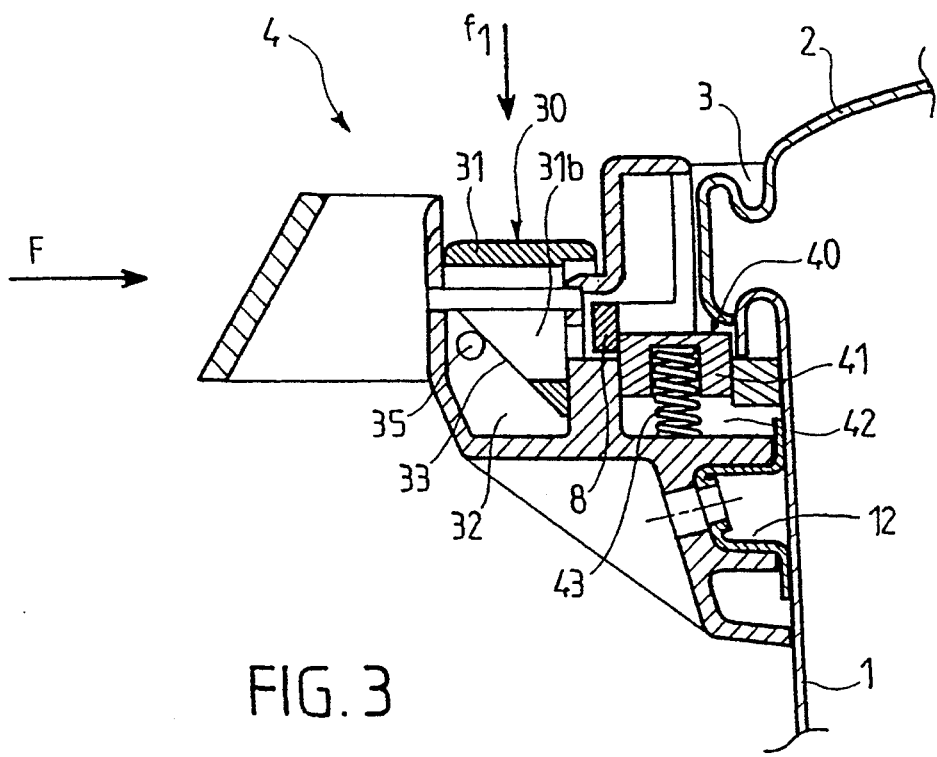
FIGS. 3 and 4 are elevational cross-sectional views through a locking-unlocking device according to the invention, FIG. 3 showing the device in an unlocking position and FIG. 4 showing the device in its locking position.
Figure 4:
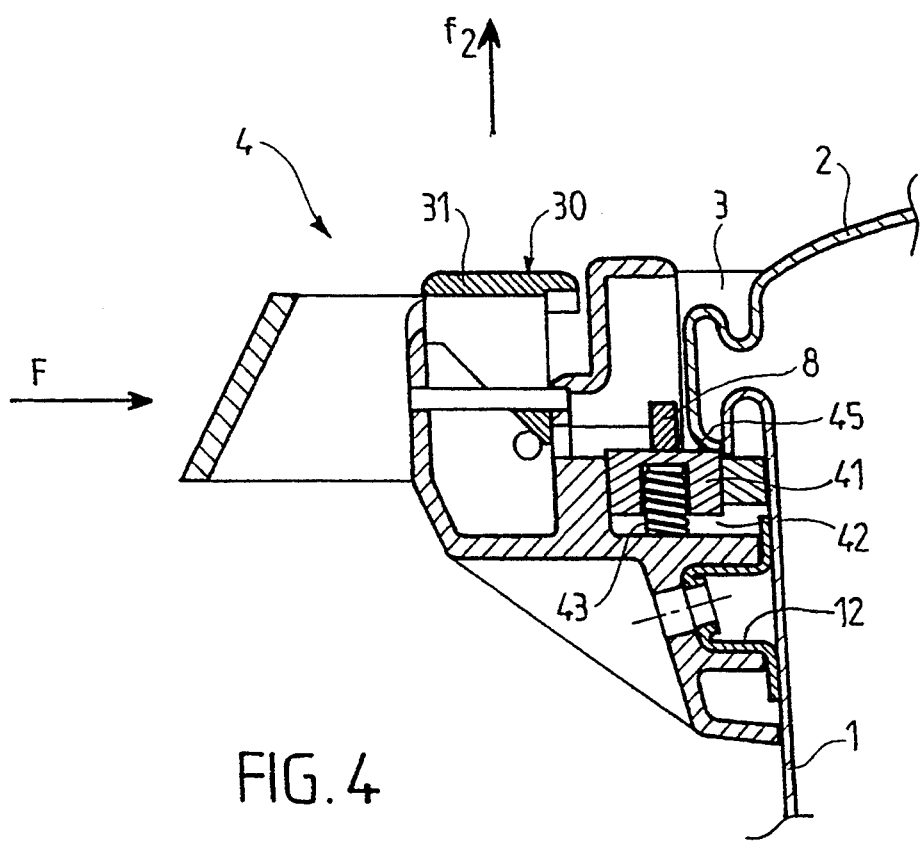

The locking-unlocking device according to the invention further includes unlocking means 30 (FIGS. 3, 4 and 5) comprising at least one control element 31 arranged to bring locking jaws 3 away from their locking position as shown in FIG. 4, in order to cause them to occupy their fixed unlocking position such as shown in FIG. 3. Control element 31 can advantageously be constituted by a push button intended to be operated by the user's fingers and mounted to slide freely in directions f1, f2 parallel to axis x-x', in a housing 32 formed in the associated handle 4. The push button is provided at its lower part with an active portion in the form of a wedge 31b comparable to a lock bolt and having an inclined face 33 facing toward the exterior of the vessel. Unlocking means 30 also include a stirrup 35 having two lateral arms which are permanently fixed to bar 8 and which extend into housing 32. The part in the form of a wedge 31b and stirrup 35 are positioned relative to one another in housing 32 so that during sliding of control element 31 from its raised position shown in FIG. 4 to its lowered unlocking position shown in FIG. 3, in the direction f1, wedge 31b progressively engages the central part of stirrup 35. During the course of displacement of control element 31 in the direction f1, substantially normal to the direction of displacement F of jaws 3, face 33, bearing against the center of stirrup 35, progressively pushes stirrup 35 in the direction opposed to the direction of force F. When control element 31 attains its lower displacement position (FIG. 3), locking jaws 3 have thus been pushed in opposition to the biasing force F generated by compression springs 16, and occupy their fixed unlocking position.

Figure 5:
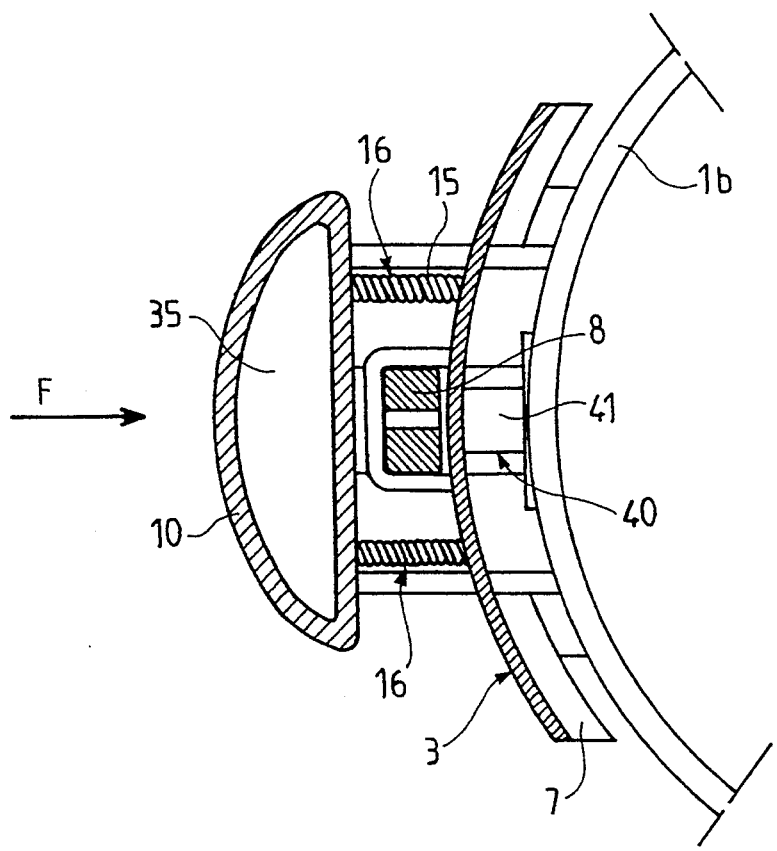
FIG. 5 is a cross-sectional plan view of a modified version of the embodiment of FIGS. 3 and 4.

In this position, shown in FIG. 5, locking jaws 3 are spaced at a distance from the walls of container 1 and are retained in this fixed position with the aid of a blocking means 40 acting on the locking jaws 3. Blocking means 40 is housed in body 11 and is retractably mounted in a manner to occupy a position for blocking locking jaws 3 in their unlocking position, as well as an unblocking position in which locking jaws 3 are freely subjected to the action of biasing means 15. Advantageously, blocking means 40 comprise an abutment piece 41 mounted to be elastically movable in a direction normal to the direction of displacement of locking jaws 3, abutment piece 41 being mounted in a recess 42 formed in body 11 and having an opening which extends beneath or in a plane corresponding to the lower surface of locking jaws 3. Abutment piece 41, constituted for example of a plastic or metal piece, is mounted to be movable in opposition to a compression spring 43 interposed between the bottom of recess 42 and the lower face of abutment piece 41 in a manner to permanently subject abutment piece 41 to a biasing force urging abutment piece 41 toward an active blocking position, where abutment piece 41 extends partially out of recess 42. Abutment piece 41 and recess 42 are advantageously disposed in the central part of body 11 in such a manner that abutment piece 41, in its position partly out of recess 42, comes to constitute, by one of its faces, a surface for blocking bar 8. In the blocking position of abutment piece 41, locking jaws 3 are maintained in the unlocking position, at a distance from the walls of the vessel against the biasing force F. In the unblocking position of abutment piece 41, corresponding to a retraction of abutment piece 41 into recess 42, locking jaws 3 are freely subjected to a centripetal action by the radial force F and can thus move to cover the opening of recess 42 as well as abutment piece 41.

The locking-unlocking device according to the invention also includes a release, or trigger, means arranged to act on blocking means 40 in order to permit them to occupy their unblocking position inducing displacement of locking jaws 3 into their locking position. In a preferred manner, the release means is constituted by a portion of cover 2 which has, for this purpose, a downwardly extending peripheral edge 45 (FIGS. 4 and 7) having a free extremity which is intended to engage, during closing of the vessel, the upper face of abutment piece 41 in order to urge abutment piece 41 downwardly into recess 42. It should be obvious that other release means can be employed, and in particular release means which are independent of cover 2 and mounted, for example, on each handle 4.

Figure 7:
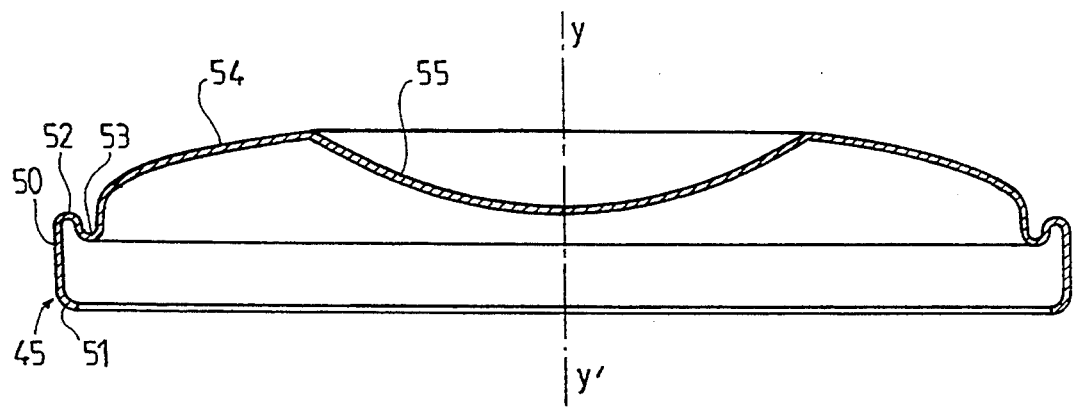
FIG. 7 is an elevational cross-sectional view of a cover usable with a locking-unlocking device according to the invention.

The locking-unlocking device according to the invention is particularly intended to be used and associated with a cover 2 having a form adapted to that of an associated circular container 1, for example, cover 2 including a cylindrical peripheral skirt 50 terminating at its lower part by the peripheral edge 45 which forms a reentrant lip 51 whose curvature is made to correspond to that of edge 7 of locking jaws 3 (FIGS. 7, 8a, 8b). Skirt 50 includes at its upper part a rolled edge 52 which is convex toward the exterior. Rolled edge 52 is followed, in the direction of the axis of symmetry y–y' of cover 2, by a rolled portion which forms a peripheral groove 53 in cover 2, groove 53 being concave toward the exterior, or the top, of cover 2. The curvature of rolled edge 52 is established in a manner to provide a profile matching the curvature of edge 6 of locking jaws 3. Such a geometric configuration permits locking jaws 3, such as shown in FIGS. 8a–8b, to assure a complete locking of the cover-container assembly. In an advantageous manner, container 1 is provided with an upper edge presenting a rim 1b which is bent outwardly and downwardly relative to the remainder of container 1, rim 1b having a lower edge against which the internal face of edge 7 of each edge 7 of locking jaws 3 comes to bear. In this manner, locking jaws 3 lock container 1 and cover 2 in a closed condition in opposition to any relative displacement in any direction in space.

Cover 2, according to the invention, also has a central part provided with a dished portion 55 having the form of a vat, or calotte, centered on axis of symmetry y–y' of cover 2. The presence of dished portion 55 permits, when the interior of the vessel is under pressure, the resultant of the pressure forces acting on cover 2 to urge the peripheral parts of the edge of cover 2 radially inwardly. In a particularly advantageous manner, dished portion 55 occupies between 40% and 60% of the total surface of cover 2 enclosed by rolled edge 52.

Cover 2 also has an annular zone 54 extending between and joining dished portion 55 to groove 53. Annular zone 54 has a curved transverse cross section which is concave in the direction opposite to the direction of the concavity of dished portion 55. Annular zone 54 can as a consequence be comparable to an elliptical curve permitting a recomposition of pressure forces acting on the internal faces of cover 2. Annular zone 54 permits in particular a predominant recomposition of the pressure forces in a horizontal plane in the external peripheral zones of cover 2. In opposition, the pressure forces are directed primarily in a vertical direction in the zones closer to the center of cover 2. The flexure moment on cover 2 is consequently maintained at values approaching a minimum.

Figure 6:
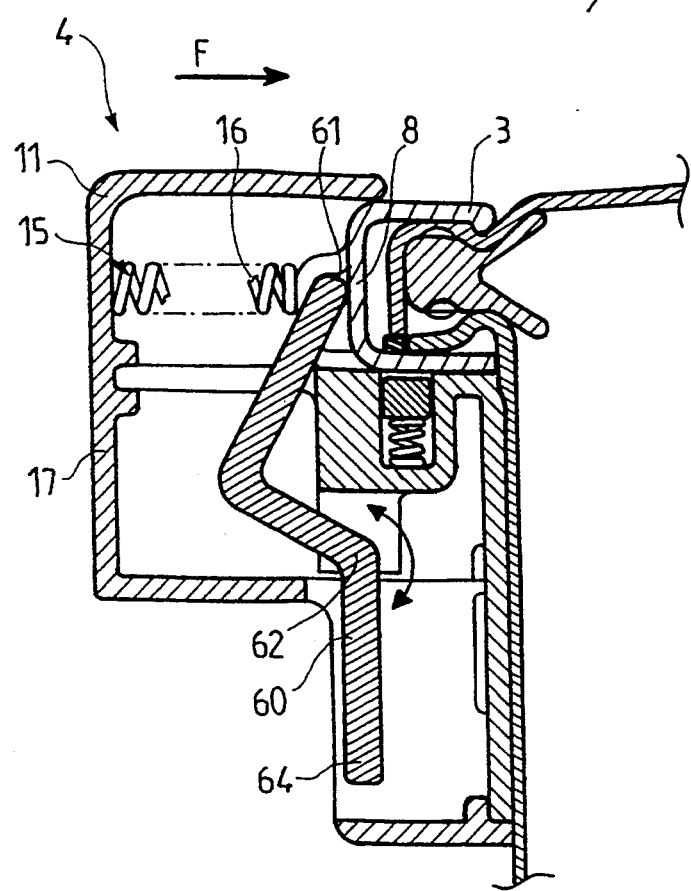
FIG. 6 is an elevational cross-sectional view of another embodiment of a locking-unlocking device according to the invention.

The alternative embodiment shown in FIG. 6 differs from the preceding only with respect to the unlocking means. For this purpose, the push button constituting control element 31 is replaced by a lever 60 mounted to be articulated about its upper end 61 on bar 8. The mounting of lever 60 in body 11 permits a pivoting of lever 60 around a median portion 62 thereof, median portion 62 being located in an intermediate region between upper end 61 and a lower end 64 of lever 60. If a user actuates, by pushing in, lower end 64, this causes lever 60 to rotate around median portion 62, causing radial displacement of locking jaws 3 into the unlocking position. If the vessel is provided with two locking-unlocking devices, as illustrated in FIG. 1, a user would normally depress lower end 64 of the lever 60 of each device. This would represent a natural, symmetric manual operation.

A locking-unlocking device according to the invention, having the structure described above, would be operated in the following manner.

Each set of locking jaws 3 being in its fixed unlocking position corresponding to the position shown in FIGS. 3 and 5, the user can position, without indexing, cover 2 on container 1. Cover 2 is then in a pre-closing position in which cover 2 and container 1 are physically associated in the manner corresponding to the closed position, but are not yet locked together. In this pre-closing position, peripheral edge 45 of cover 2 comes to engage abutment piece 41. In effectuating an axial pressure along axis x–x' in the direction toward the bottom of the vessel, the user then assures retraction of abutment piece 41 into recess 42, which permits locking jaws 3 to be freely subjected to the force F generated by compression springs 16. Locking jaws 3 then come to occupy their locking position shown in FIGS. 1, 4 and 8a, 8b. In this position, length segments 3' assure relative confinement of cover 2 on container 1, and vice versa, with a relative pre-existing play (FIG. 8a) between edge 6 and edge 7, on the one hand, and rolled edge 52 and rolled edge 52, on the other hand.

During use of the vessel, internal pressure resulting from cooking develops on internal faces of cover 2, and this pressure causes rolled edge 52 to be pressed against edge 6, which develops a reactive force assuring locking (FIG. 8b). Under these operating conditions, no inadvertent opening of the jaws is possible, the necessary radial outward force being too great to be able, on the one hand, to overcome the resultant of the internal pressure and the resultant reactive forces between edge 6 and rolled edge 52.

When the internal cooking pressure returns to atmospheric, the user assures opening of the vessel by actuating the push buttons or levers which permit radial outward displacement of locking jaws 3. The end of actuating travel of the push buttons or levers corresponds to a sufficient outward radial movement of locking jaws 3, out of the region above recess 42 to permit abutment piece 41 to occupy its raised position for blocking locking jaws 3 in their unlocking position. The user can then open the vessel by lifting cover 2. It appears that the utilization of radially movable locking jaws 3 permits a prepositioning of cover 2 without precise indexing of its position relative to container 1, and that the manipulations required for locking are limited to a simple axial downward force on cover 2 by the user. In the same manner, opening of the vessel equally requires a simple and easily learnable manipulation, which also is in the axial direction and is directed in the same sense as the axial closing force. Learning is thus greatly facilitated, and virtually any risk of actuation error is eliminated.

By way of modification, it is obviously possible to reverse the displacement kinematics of locking jaws 3 and to mount them on cover 2, without departing from the spirit and framework of the present invention.

To complete the description, it will be noted that cover 2 is shown in FIGS. 1 and 2 to be provided with a central lifting handle and a pressure regulator, which form no part of the present invention, and are therefore not described in detail.

This application relates to subject matter disclosed in French Application number 9301961, filed on Feb. 15, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a locking-unlocking device for a cooking vessel having a vertical center axis and composed of a container and a cover, for securing the cover to the container, the container having a side wall with an upper peripheral edge defining an open top, the device including a plurality of locking jaw assemblies mounted on the vessel at locations spaced apart about the center axis of the vessel, each locking jaw assembly including locking jaws which are movable into a locking position for securing the cover to the container; and unlocking means linked to the locking jaws for moving the locking jaws to an unlocking position in which the cover is separable from the container, the improvement wherein each said locking jaw assembly further comprises:

biasing means operatively associated with said locking jaws for elastically urging said locking jaws in radial directions relative to the vessel center axis in a direction from the unlocking position to the locking position;

blocking means movable between an extended position for maintaining said locking jaws in the unlocking position and a retracted position for allowing said locking jaws to be positioned in response to said biasing means; and release means coupled to said blocking means and operative for causing said blocking means to move to the retracted position.

2. A device as defined in claim 1 wherein said locking jaws of each said assembly extend along a portion of the peripheral edge of the container and include: a face which extends along at least a segment of the peripheral edge portion and is substantially parallel to the container side wall; and a first clamping edge forming an angle with said face and disposed to bear against one of the cover and container when the locking jaws are in the locking position.

3. A device as defined in claim 2 wherein said locking jaws of each said assembly further includes a second clamping edge forming an angle with said face, said face forming with said first and second clamping edges a U-shaped clamping structure for clamping together the cover and container.

4. A device as defined in claim 3 wherein each locking jaw assembly has two U-shaped clamping structures and a connecting bar connecting together said two clamping structures.

5. A device as defined in claim 1 wherein said clamping jaw assemblies are secured to the container.

6. A device as defined in claim 5 wherein the container is provided with handles and a respective locking jaw assembly is mounted in each handle.

7. A device as defined in claim 1 wherein said biasing means comprise at least one compression spring disposed for exerting a biasing force on said locking jaws to urge said locking jaws toward the center axis of the vessel.

8. A device as defined in claim 1 wherein said unlocking means comprise a control element operative for moving said locking jaws from the locking position to the unlocking position.

9. A device as defined in claim 8 wherein each said locking jaw assembly further comprises a stirrup member fixed to said locking jaws, and said control element comprises a push button element mounted for sliding movement in a direction substantially perpendicular to the direction of movement of said locking jaws and having an active part in the form of a wedge disposed to engage said stirrup member to move said locking jaws away from the center axis of the vessel during sliding movement of said push button element.

10. A device as defined in claim 8 wherein said control element comprises a lever having two opposed ends, with one end being articulated to said locking jaws and said lever being pivotally mounted for radially displacing said locking jaws upon being actuated at the other opposed end.

11. A device as defined in claim 1 wherein said blocking means comprise an abutment piece mounted for movement between the extended position and the retracted position.

12. A device as defined in claim 11 wherein each said assembly is formed to define a housing, located below said locking jaws and said abutment piece is mounted for movement in said housing in a direction substantially perpendicular to the direction of movement of said locking jaws, said locking jaws have a lower surface and said housing has an open top which is not above said lower surface of said locking jaws, such that when in the locking position, said locking jaws cover said abutment piece and said abutment piece is in the retracted position, and when the unlocking position, said locking jaws abut against said abutment piece.

13. A device as defined in claim 12 wherein said blocking means further comprise a spring for elastically urging said abutment piece into said extended position in which said abutment piece maintains said locking jaws in the unlocking position.

14. A device as defined in claim 1 wherein said release means is constituted by the cover.

15. A device as defined in claim 14 wherein the cover has a downwardly extending peripheral edge for engaging said blocking means when the cover closes the container.

16. A device as defined in claim 2 wherein said first clamping edge has a curvature with a concavity directed toward the bottom of the vessel and forming an upper edge of said locking jaws, the curvature being formed to cooperate with a rolled edge of the cover when the locking jaws are in the locking position.

17. A device as defined in claim 16 wherein the cover has a central part provided with a dished zone which is concave in a direction exterior to the vessel.

18. A device as defined in claim 17 wherein the dished zone has an area equal to about 40-60% of the total surface area of the cover.

19. A device as defined in claim 17 wherein the cover has a peripheral zone and an annular zone joining the peripheral zone to the dished zone, the peripheral zone having an annular recess which presents a groove which is concave toward the exterior of the cover and the annular zone having a cross section which is curved to be concave in a direction opposite to the direction of concavity of the dished zone.

20. A cooking vessel constituting a pressure cooker, said cooking vessel having a vertical center axis and comprising:
  a container having a side wall with an upper peripheral edge defining an open top;
  a cover; and
  a locking-unlocking device coupled between said container and said cover for securing said cover to said container, said device including a plurality of locking jaw assemblies mounted on said vessel at locations spaced apart about the center axis of said vessel, each locking jaw assembly including locking jaws which are movable into a locking position for securing said cover to said container; and unlocking means linked to said locking jaws for moving said locking jaws to an unlocking position in which said cover is separable from said container, wherein each said locking jaw assembly further comprises:
  biasing means operatively associated with said locking jaws for elastically urging said locking jaws in radial directions relative to the vessel center axis in a direction from the unlocking position to the locking position;
  blocking means movable between an extended position for maintaining said locking jaws in the unlocking position and a retracted position for allowing said locking jaws to be positioned in response to said biasing means; and
  release means coupled to said blocking means and operative for causing said blocking means to move to the retracted position.

* * * * *